(12) United States Patent
Ishihara

(10) Patent No.: US 9,162,315 B2
(45) Date of Patent: Oct. 20, 2015

(54) ELECTRICAL CONDUCTION MECHANISM

(75) Inventor: Kosei Ishihara, Takasaki (JP)

(73) Assignee: Star Co., Ltd., Gunma-ken (JP)

( * ) Notice: Subject to any disclaimer, the term of this patent is extended or adjusted under 35 U.S.C. 154(b) by 961 days.

(21) Appl. No.: 13/252,946

(22) Filed: Oct. 4, 2011

(65) Prior Publication Data

US 2012/0085578 A1   Apr. 12, 2012

(30) Foreign Application Priority Data

Oct. 11, 2010 (JP) ................. 2010-241467

(51) Int. Cl.
| | |
|---|---|
| B23K 9/28 | (2006.01) |
| B23K 11/00 | (2006.01) |
| B21D 1/06 | (2006.01) |
| B23K 11/14 | (2006.01) |
| B23K 11/36 | (2006.01) |
| B60S 5/00 | (2006.01) |
| H01R 13/187 | (2006.01) |
| H01R 39/26 | (2006.01) |

(52) U.S. Cl.
CPC ............... *B23K 11/004* (2013.01); *B21D 1/06* (2013.01); *B23K 11/14* (2013.01); *B23K 11/366* (2013.01); *B60S 5/00* (2013.01); *H01R 13/187* (2013.01); *H01R 39/26* (2013.01); *B23K 2201/006* (2013.01); *B23K 2201/18* (2013.01)

(58) Field of Classification Search
CPC ....... B23K 9/201; B23K 2201/18; B21D 1/06
USPC ................. 219/86.21, 98; 72/391.2, 479, 705
See application file for complete search history.

(56) References Cited

U.S. PATENT DOCUMENTS

| | | | | |
|---|---|---|---|---|
| 2,908,803 | A | * 10/1959 | Williams et al. | ................. 219/84 |
| 3,801,772 | A | * 4/1974 | Curcio et al. | ................... 219/98 |
| 4,037,448 | A | 7/1977 | Di Maio et al. | |
| 4,050,271 | A | 9/1977 | Jones | |
| 4,089,201 | A | 5/1978 | Raptis | |

(Continued)

FOREIGN PATENT DOCUMENTS

| | | |
|---|---|---|
| DE | 866 525 | 7/1949 |
| DE | 1 233 935 | 2/1967 |

(Continued)

OTHER PUBLICATIONS

European Patent Application No. 11184351.2 Office Action dated Feb. 10, 2012, 7 pages.

*Primary Examiner* — Dana Ross
*Assistant Examiner* — Ayub Maye

(57) ABSTRACT

An electrical conduction mechanism is provided to prevent dust or from adhering to the inside of an electrical-conduction portion main body, so that electrical conduction efficiency cannot be reduced. The electrical conduction mechanism comprises an electrical-conduction portion main body in the center of which a first through-hole to be inserted through by a shaft is formed and in which a second through-hole communicating with the first through-hole is formed in a direction perpendicular to a direction in which the first through-hole is formed. The electrical-conduction element is disposed in the second through-hole. The electrical-conduction element is configured to include an electrical-conduction chip abutting on the shaft, and a coil spring biasing the electrical-conduction chip toward the shaft, so that current is supplied to the shaft through the electrical-conduction chip to conduct electricity to the bit.

13 Claims, 14 Drawing Sheets

(56) References Cited

U.S. PATENT DOCUMENTS

| | | | |
|---|---|---|---|
| 4,116,035 A * | 9/1978 | Malarsky | 72/389.6 |
| 4,183,598 A | 1/1980 | Aarninkhof | |
| 4,376,385 A * | 3/1983 | Davis | 72/479 |
| 4,914,942 A | 4/1990 | Ishihara | |
| 4,930,335 A | 6/1990 | Ishihara | |
| 5,333,486 A * | 8/1994 | Ishihara | 72/391.2 |
| 5,918,501 A * | 7/1999 | Sunaga et al. | 72/479 |
| 5,943,902 A | 8/1999 | Ishihara | |
| 6,679,092 B2 | 1/2004 | Irii | |
| 6,722,179 B1 * | 4/2004 | Ventura | 72/454 |
| 2002/0174704 A1 * | 11/2002 | Olsson | 72/705 |

FOREIGN PATENT DOCUMENTS

| | | |
|---|---|---|
| DE | 8618109 | 12/1986 |
| JP | 61-132222 | 6/1986 |
| JP | 10-052717 | 2/1998 |
| JP | 2876402 | 1/1999 |
| WO | 01/05531 | 1/2001 |

* cited by examiner

F I G. 1
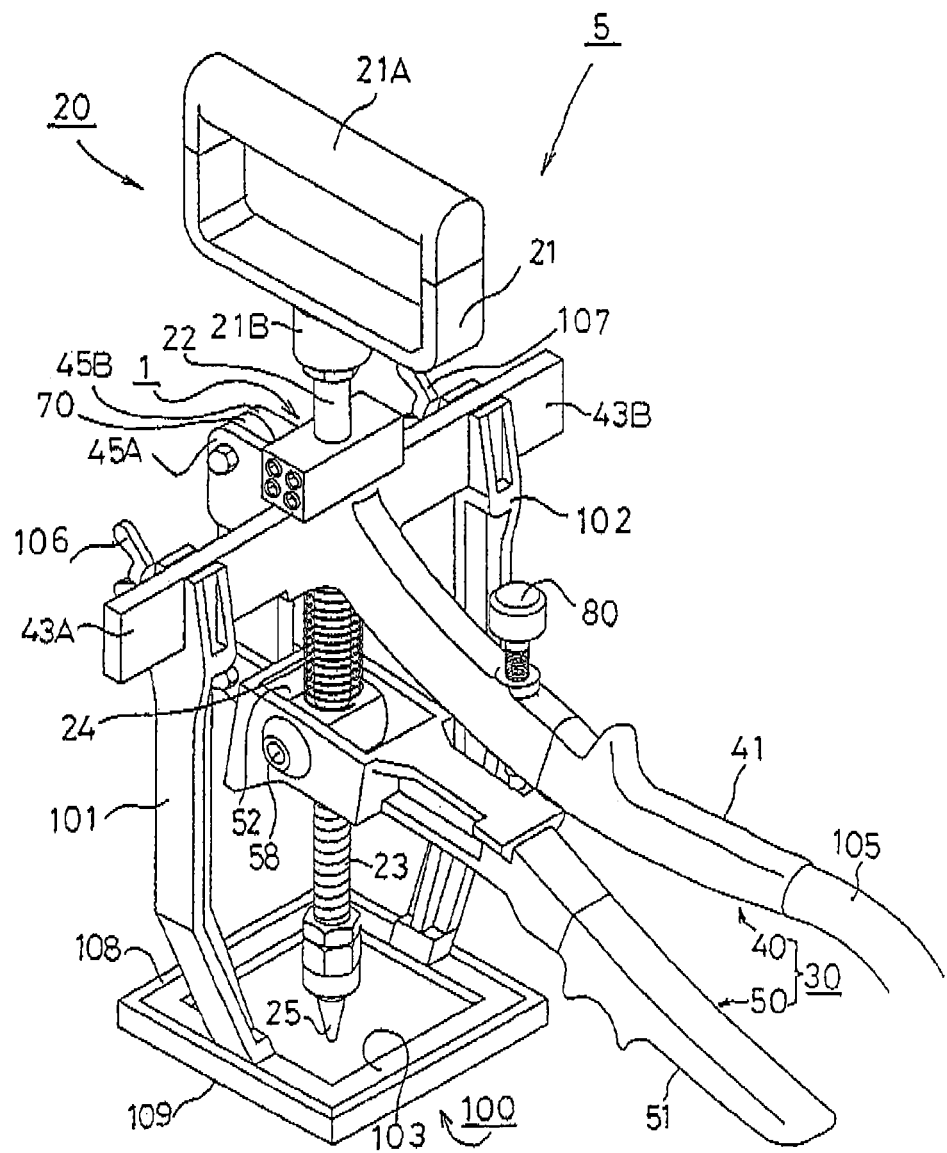

ELECTRICAL CONDUCTION MECHANISM

BACKGROUND OF THE INVENTION

1. Field of the Invention

The present invention relates to an electrical conduction mechanism, and relates to, for example, an electrical conduction mechanism suitable to conduct electricity to a weld bit constituting a member of a sheet-metal puller which is advantageous for pulling out a dent on a sheet-metal face during sheet-metal work.

2. Description of Related Art

As a sheet-metal puller which is advantageous for pulling out a dent on a sheet-metal face during sheet-metal work, a sheet-metal puller shown in FIGS. 12 to 14 has been suggested by the inventor of the present application.

A conventional sheet-metal puller 205 shown in FIGS. 12 to 14 is made available with a clamping means 210 of a power source cord 215 attached to a cord connection portion 221B continuously connected to a handle 221 of the sheet-metal puller and with the other end of the power source cord connected to a welder 7, and is capable of efficiently performing within a short time a sequence of sheet-metal work steps of applying current to a bit 225 which is disposed in a distal end portion of a shaft 222 configuring the sheet-metal puller and which is weldable on a sheet-metal face, welding a distal end of the bit on a sheet-metal repair face to pull up a dent on the sheet-metal repair face, and further releasing welding of the bit after pulling up the dent. However, since longer power source cord 215 gains more weight, and electrical conduction is performed by attaching the clamping means 210 of the power source cord to the cord connection portion 221B continuously connected to the handle 221, the following improvements (1), (2), and (3) have been, for example, required. More specifically, the following problems have been pointed out.

(1) Though the position of the center of gravity of the sheet-metal puller is determined on the assumption that it is used in a vertical position, the automotive sheet-metal work often involves repair of an automotive side face, and accordingly the sheet-metal puller is often used in a lateral position as a matter of course (see FIG. 12). However, the cord connection portion 221B of the sheet-metal puller is disposed in an upper portion of the sheet-metal puller, and therefore, when the sheet-metal puller 205 is used in the lateral position, the position of the center of gravity thereof is deviated from that located when the sheet-metal puller is used in the vertical position, due to the weight of the power source cord 215 (if the position of the center of gravity of the sheet-metal puller when it is used in the vertical position is located at P2 in FIG. 12, P2 is deviated downward in FIG. 12, as shown by a broken line in FIG. 12, when the sheet-metal puller is used in the lateral position). Thus, a fulcrum Q2 formed in a first manipulating member 140 of the sheet-metal puller during sheet-metal repair work fluctuates to be unfixed, and even if the sheet-metal work takes a long time, a hand holding the sheet-metal puller gets tired and comes to feel heavy, which results in degradation in workability;

(2) The cord connection portion 221B formed in the handle 221 of the sheet-metal puller 205 and the clamping means 210 of the power source cord are in pivotal contact with each other, and therefore, as the sheet-metal puller 205 is more often used, a peripheral face of the cord connection portion 221B and inner wall faces of clamping bodies 210A, 210B of the clamping means 210, which are in contact with each other, are worn or scratched thereby necessitating replacement of the handle or the clamp means;

(3) Since the clamping means 210 of the power source cord 215 constituting an electrical electrical-conduction unit is exposed outside, dust or the like adheres to the clamping bodies of the clamping means 210, which causes reduction in electrical conduction efficiency;

SUMMARY OF THE INVENTION

Therefore, it is an object of the present invention to provide an electrical conduction mechanism that conducts electricity to a bit which is disposed in a distal end portion of a shaft and which is weldable on a sheet-metal face, with the electrical conduction mechanism being installed in the middle of a sheet-metal puller, and a power source cord being connected to a sheet-metal manipulating member, thereby preventing a position of the center of gravity of the sheet-metal puller used in a lateral position from deviating from the position of the center of gravity of the sheet-metal puller used in a vertical position due to the weight of the power source cord, so that a fulcrum formed in the sheet-metal manipulating during sheet-metal repair work does not fluctuate and thus becomes stable, and that even if the sheet-metal work takes a long time, a hand holding the sheet-metal puller does not get tired and good workability is ensured.

It is another object of the present invention to provide a long-life electrical conduction mechanism which conducts electricity stably even when the frequency of its use is high.

It is still another object of the present invention to provide an electrical conduction mechanism which is of a sealed type, thereby preventing dust or the like from adhering to the inside of an electrical-conduction portion main body, so that electrical conduction efficiency cannot be reduced.

An electrical conduction mechanism according to the present patent application is an electrical conduction mechanism which conducts electricity to a bit which is disposed in a distal end portion of a shaft and which is weldable on a sheet-metal face. The electrical conduction mechanism comprises an electrical-conduction portion main body which is formed with a conductive member, in the center of which a first through-hole to be inserted through by the shaft is formed, and in which a second through-hole communicating with the first through-hole is formed in a direction perpendicular to a direction in which the first through-hole is formed; and an electrical-conduction element disposed in the second through-hole; wherein the electrical-conduction element is configured to include an electrical-conduction chip abutting on the shaft and a coil spring biasing the electrical-conduction chip toward the shaft, so that current is supplied to the shaft through the electrical-conduction chip to conduct electricity to the bit.

It is preferred that the electrical-conduction chip have a distal face obtained by cutting a columnar member obliquely so as to form an elliptical section, so that the distal face of the electrical-conduction chip and the shaft abut on each other by line contact in the electrical-conduction portion main body.

It is preferred that the second through-hole be formed with lateral holes at four places in upper and lower and right and left directions of the electrical-conduction portion main body relative to each other, that the electrical-conduction element be disposed in each of the lateral holes with the shaft inserted into the first through-hole, and that the electrical-conduction chips facing each other via the shaft abut on the shaft with equal pressure.

It is preferred that an electrical conduction mechanism according to the present patent application be an electrical conduction mechanism which conducts electricity to a bit which is disposed in a distal end portion of a shaft and which is weldable on a sheet-metal face; comprising: an electrical-conduction portion main body which is formed with a conductive member, in the center of which a first through-hole through to be inserted through by the shaft is formed, and in which a second through-hole communicating with the first through-hole is formed in a direction perpendicular to a direction in which the first through-hole is formed; and an electrical-conduction element disposed in the second through-hole; wherein the electrical-conduction element is configured to include an electrical-conduction chip abutting on the shaft, a coil spring biasing the electrical-conduction chip toward the shaft, and a spacer formed with an insulator which is interposed between the electrical-conduction chip and the coil spring to put the electrical-conduction chip and the coil spring in a non-conductive state, so that current is supplied to the shaft through the electrical-conduction chip to conduct electricity to the bit.

It is preferred that the electrical-conduction element be inserted into the second through-hole, and that, with the electrical-conduction chip abutting on the shaft, a screw be screwed into an opening portion of the second through-hole to close the opening portion.

An electrical conduction mechanism according to the present patent application may be also an electrical conduction mechanism which conducts electricity to a bit of a sheet-metal puller, and which is equipped with a first manipulating member provided with a bit which is disposed in a distal end portion of a shaft and which is weldable on a sheet-metal face, a supporting portion for supporting the first manipulating member a second manipulating member for pulling up the first manipulating member, and a leg body for supporting the second manipulating member; comprising an electrical-conduction portion main body which is formed with a conductive member, in the center of which a first through-hole to be inserted through by the shaft is formed, and in which a second through-hole communicating with the first through-hole is formed in a direction perpendicular to a direction in which the first through-hole is formed; and an electrical-conduction element disposed in the second through-hole; wherein the electrical-conduction element is configured to include an electrical-conduction chip abutting on the shaft, and a coil spring biasing the electrical-conduction chip toward the shaft, so that current is supplied to the shaft through the electrical-conduction chip to conduct electricity to the bit.

An electrical conduction mechanism according to the present patent application may be further an electrical conduction mechanism which conducts electricity to a bit of a sheet-metal puller, and which is equipped with a shaft, a first manipulating member provided with the bit which is disposed in a distal end portion of the shaft and which is weldable on a sheet-metal face, a second manipulating member which is provided with a supporting portion for supporting the first manipulating member and which pulls up the first manipulating member manually, and a leg body for supporting the second manipulating member; comprising an electrical-conduction portion main body which is formed with a conductive member, in the center of which a first through-hole to be inserted through by the shaft is formed, and in which a second through-hole communicating with the first through-hole is formed in a direction perpendicular to a direction in which the first through-hole is formed; and an electrical-conduction element disposed in the second through-hole; wherein the electrical-conduction element is configured to include an electrical-conduction chip abutting on the shaft, a coil spring biasing the electrical-conduction chip toward the shaft, and a spacer formed with an insulator which is interposed between the electrical-conduction chip and the coil spring to put the electrical-conduction chip and the coil spring in a non-conductive state, so that current is supplied to the shaft through the electrical-conduction chip to conduct electricity to the bit.

The present invention is configured in the above manner, and according to the present invention, the following effects are achieved.

(1) The electrical conduction mechanism which conducts electricity to a bit which is disposed in a distal end portion of a shaft and which is weldable on a sheet-metal face is installed in the center of the sheet-metal puller, and the power source cord is connected to the sheet-metal manipulating member, and therefore even when the sheet-metal puller is used in a lateral position, the position of the center of gravity of the sheet-metal puller is prevented from deviating from the position of the center of gravity thereof when the sheet-metal puller is used in a vertical position, due to the weight of the power source cord. Thus a fulcrum formed in the sheet-metal manipulating member of the sheet-metal puller during sheet-metal repair work is prevented from fluctuating and becomes stable, and even if the sheet-metal work takes a long time, a hand holding the sheet-metal puller is preventing from getting tired, so that good workability can be ensured.

(2) An electrical conduction mechanism can be obtained which conducts electricity stably even when the frequency of its use is high.

(3) An electrical conduction mechanism can be obtained which is of a sealed type, thereby preventing dust or the like from adhering to the inside of an electrical-conduction portion main body, so that electrical conduction efficiency can be reduced.

BRIEF DESCRIPTION OF THE DRAWINGS

FIG. 13 is a schematic view showing a configuration of an electrical-conduction portion formed in the conventional sheet-metal puller.

DETAILED DESCRIPTION OF THE PREFERRED EMBODIMENT

An electrical conduction mechanism makes it possible to conduct electricity to a bit which is disposed in a distal end portion of a shaft and which is weldable on a sheet-metal face; and is provided with an electrical-conduction portion main body which is formed with a conductive member, in the center of which a first through-hole to be inserted through by the shaft is formed, and in which a second through-hole communicating with the first through-hole is formed in a direction perpendicular to a direction in which the first through-hole is formed; and an electrical-conduction element disposed in the second through-hole. The electrical-conduction element is configured to include an electrical-conduction chip abutting on the shaft, and a coil spring biasing the electrical-conduction chip toward the shaft, so that current is supplied to the shaft through the electrical-conduction chip to conduct electricity to the bit.

The electrical conduction mechanism which conducts electricity to the bit which is disposed in the distal end portion of the shaft and which is weldable on the sheet-metal face is installed in the center of the sheet-metal puller, and a power source cord is connected to a sheet-metal manipulating member, and therefore even if the sheet-metal puller is used in a lateral position, the position of the center of gravity the sheet-metal puller is prevented from deviating from the position of the center of gravity thereof when the sheet-metal puller is used in a vertical position, due to the weight of the power source cord. Thus a fulcrum formed in the sheet-metal manipulating member of the sheet-metal puller during sheet-metal repair work is prevented from fluctuating and becomes stable, and even if the sheet-metal work takes a long time, a hand holding the sheet-metal puller is preventing from getting tired, so that good workability can be ensured.

An embodiment of the electrical conduction mechanism according to the present invention, together with the sheet-metal puller incorporating the electrical conduction mechanism, will be described below with reference to the drawings.

Figure 4:
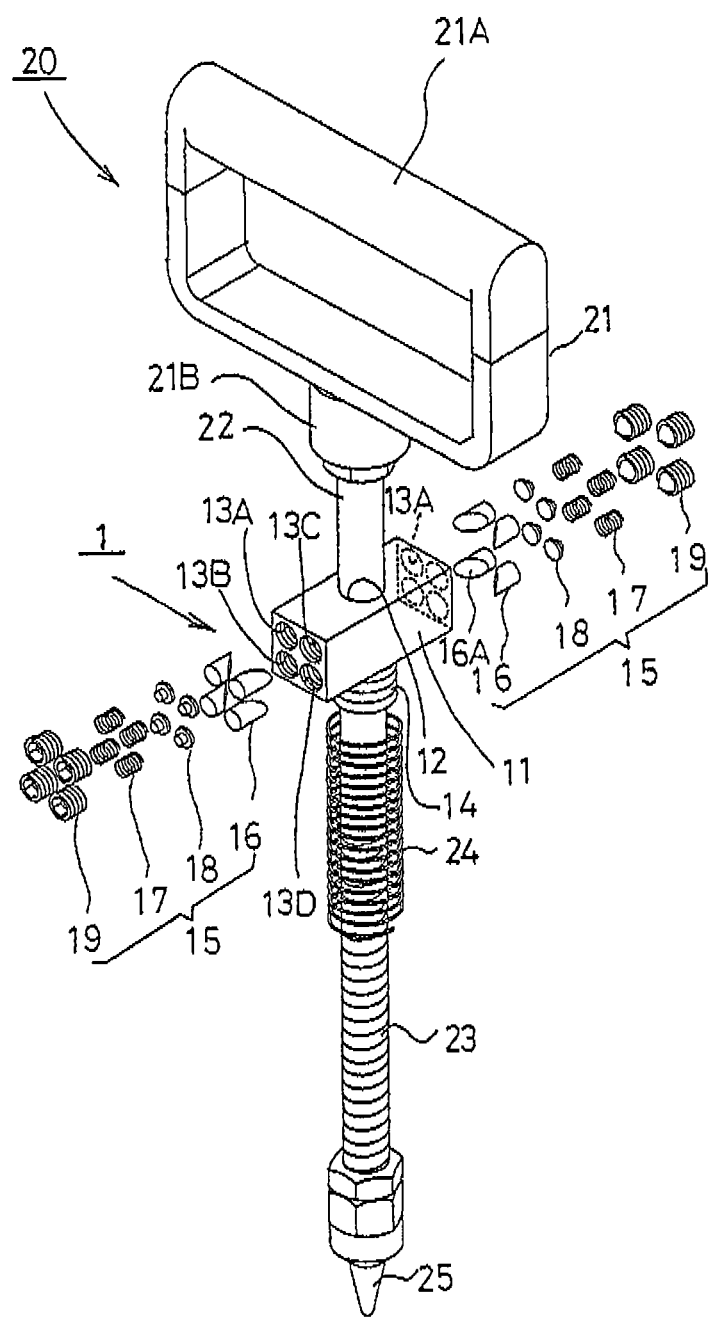
FIG. 4 is an exploded perspective view showing constituent components of the electrical conduction mechanism according to the present invention.
Figure 5:
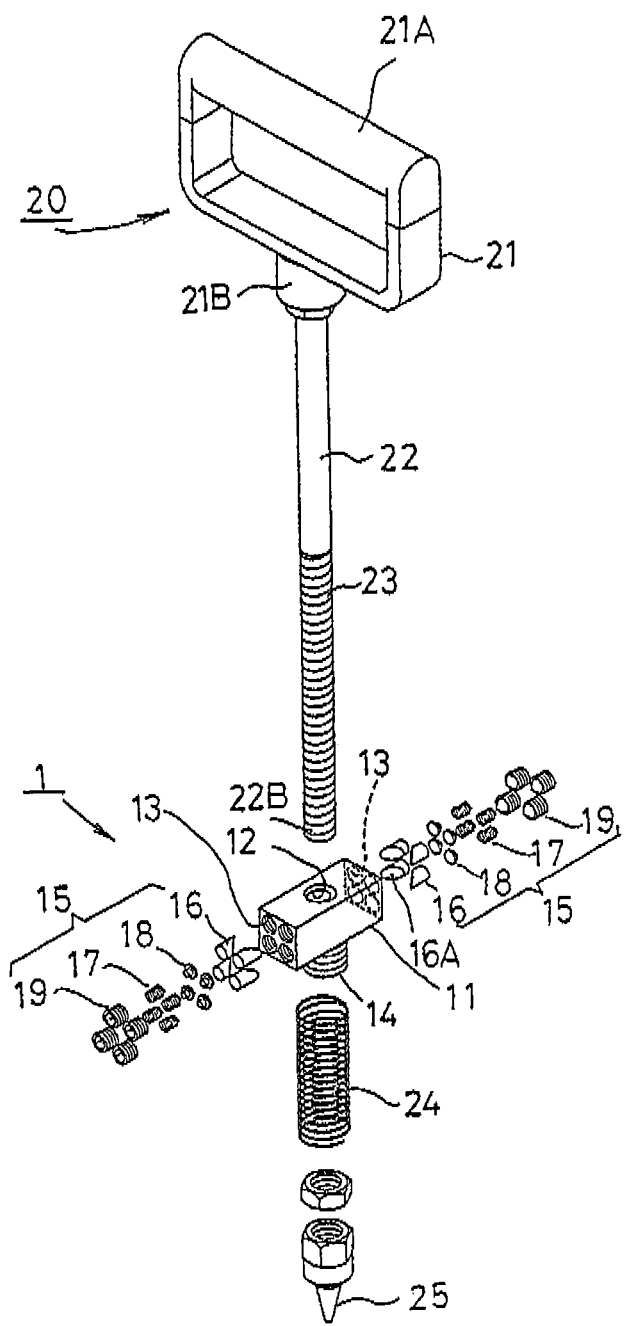
FIG. 5 is an exploded perspective view showing constituent components of the electrical conduction mechanism according to the present invention.

Electrical Conduction Mechanism:

In FIGS. 4 and 5, an electrical conduction mechanism 1 according to the present invention is formed as an electrical conduction mechanism which conducts electricity to a bit 25 which is disposed in a distal end portion of a shaft 22 and which is weldable on a sheet-metal face.

Figure 9:
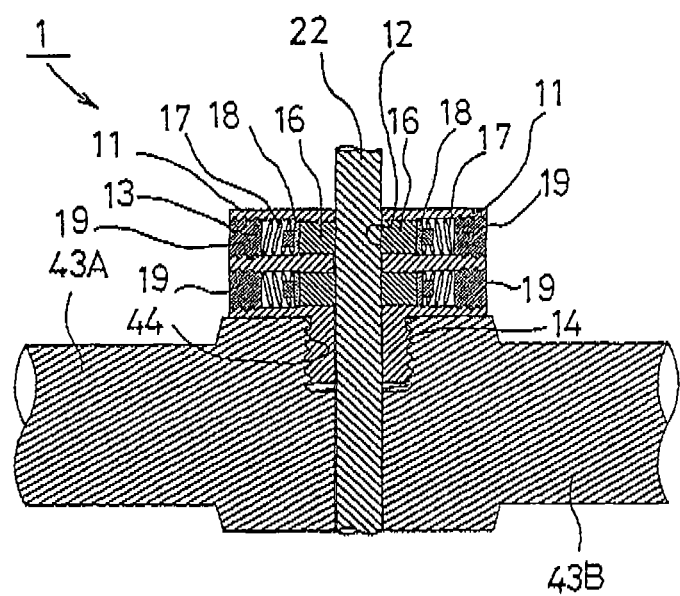
FIG. 9 is an enlarged schematic view of a section taken along Y-Y in FIG. 8.

The electrical conduction mechanism 1 is formed with a conductive member; and comprises an electrical-conduction portion main body 11 in the center of which a first through-hole 12 to be inserted through by the shaft 22 is formed, and in which a second through-hole 13 communicating with the first through-hole 12 is formed in a direction perpendicular to a direction in which the first through-hole 12 is formed; and an electrical-conduction element 15 disposed in the second through-hole 13. A coupling portion 14 is formed on a lower portion of the electrical-conduction portion main body 11 so as to extend from the main body. The coupling portion 14 is screwed in a through-hole 44 formed in a main lever 40 described later to be coupled to the main lever 40 (see FIG. 9).

Figure 7:
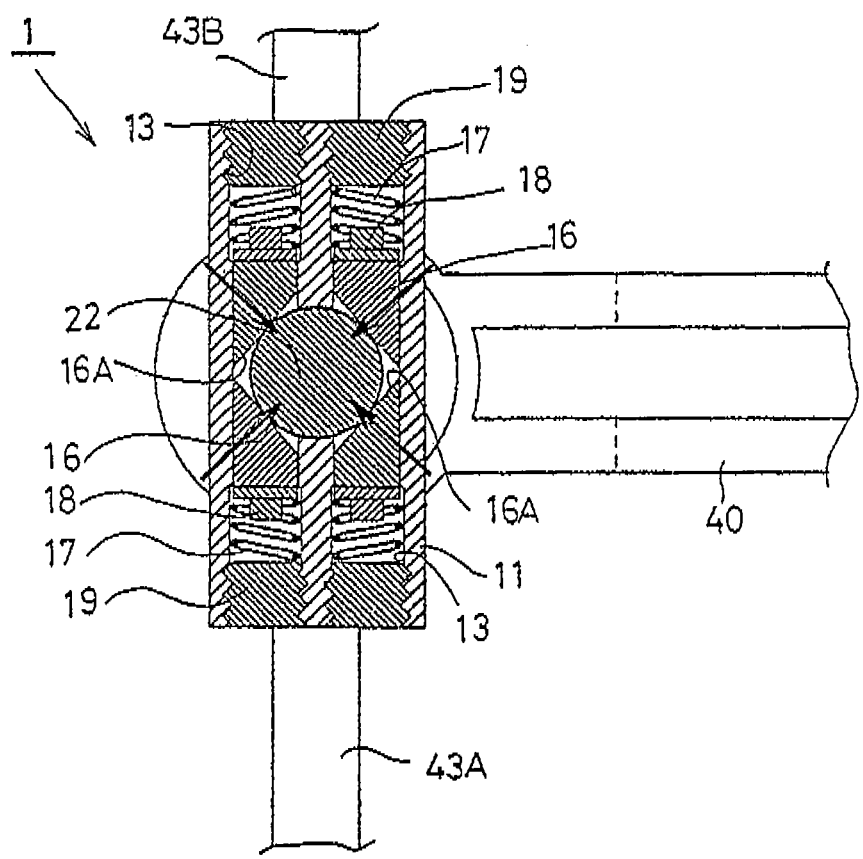
FIG. 7 is an enlarged schematic view of a section taken along X-X in FIG. 2, including the flow of current during electricity conduction.
Figure 8:
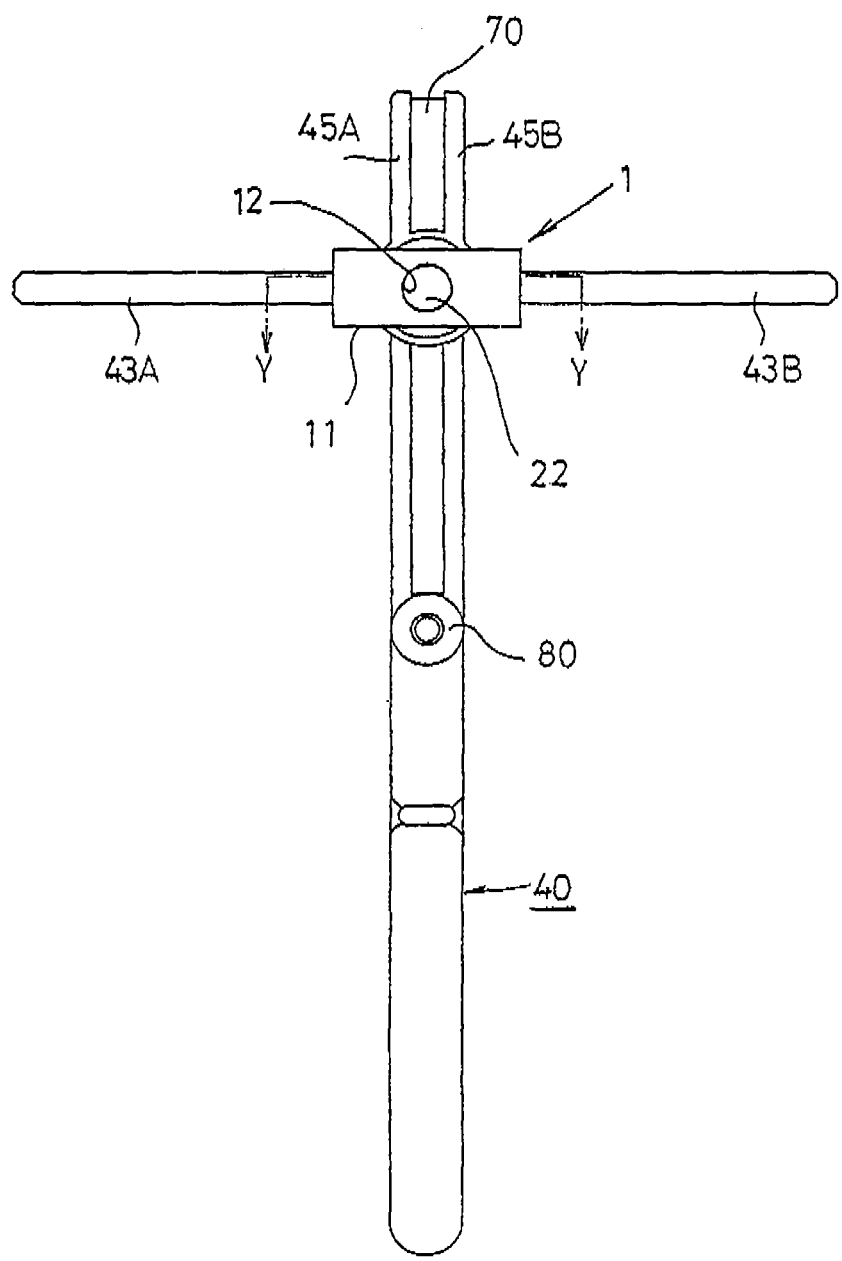
FIG. 8 is a schematic plan view of the electrical conduction mechanism incorporated in the sheet-metal puller shown in FIG. 2.

The electrical-conduction element 15 is configured to include an electrical-conduction chip 16 abutting on the shaft 22, and a coil spring 17 biasing the electrical-conduction chip toward the shaft, so that current is supplied to the shaft through the electrical-conduction chip to conduct electricity to the bit (see FIG. 7).

The electrical-conduction chip 16 has a distal face 16A obtained by cutting a columnar member obliquely so as to form an elliptical section, so that the distal face 16A of the electrical-conduction chip 16 and the shaft 22 abut on each other by line contact in the electrical-conduction portion main body (see FIG. 7).

The second through-hole 13 is formed with lateral holes 13A, 13B, 13C, 13D at four places in upper and lower and right and left directions of the electrical-conduction portion main body relative to one another (see FIG. 4); the electrical-conduction element 15 is disposed in each of the lateral holes with the shaft 22 inserted into the first through-hole 12; and the electrical-conduction chips 16 facing each other via the shaft abut on the shaft 22 with equal pressing force.

A spacer 18 formed with an insulator is interposed between the electrical-conduction chip and the coil spring to put the electrical-conduction chip 16 and the coil spring 17 in a non-conductive state. Thus, no current flows into the coil spring 17, thereby avoiding the coil spring 17 from being burnt out by current (no current flows into the coil spring 17 through the electrical-conduction chip 16).

The electrical-conduction element 15 is inserted into the second through-hole 13, and, with the electrical-conduction chip abutting on the shaft, a screw 19 is screwed into an opening port ion of the second through-hole to close the opening portion.

Figure 2:
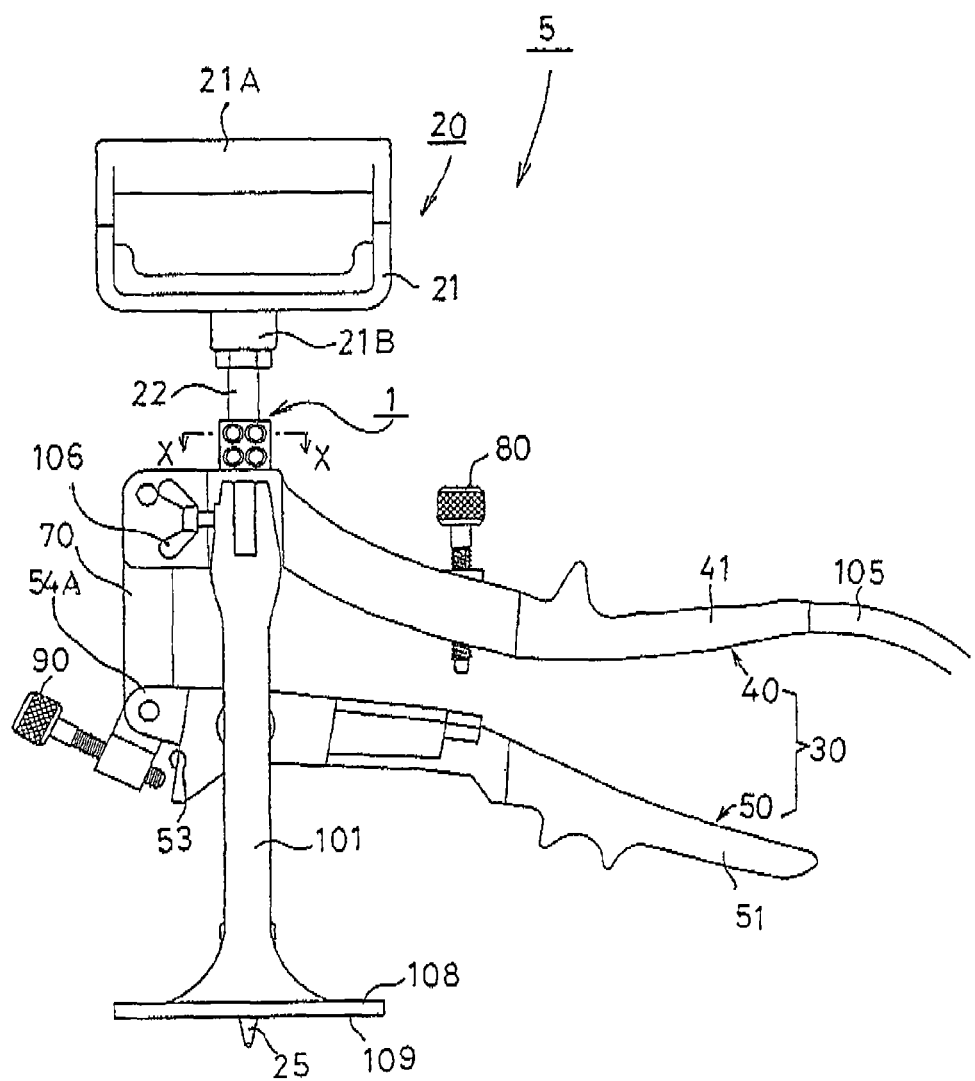
FIG. 2 is a side view of the sheet-metal puller shown in FIG. 1.
Figure 3:
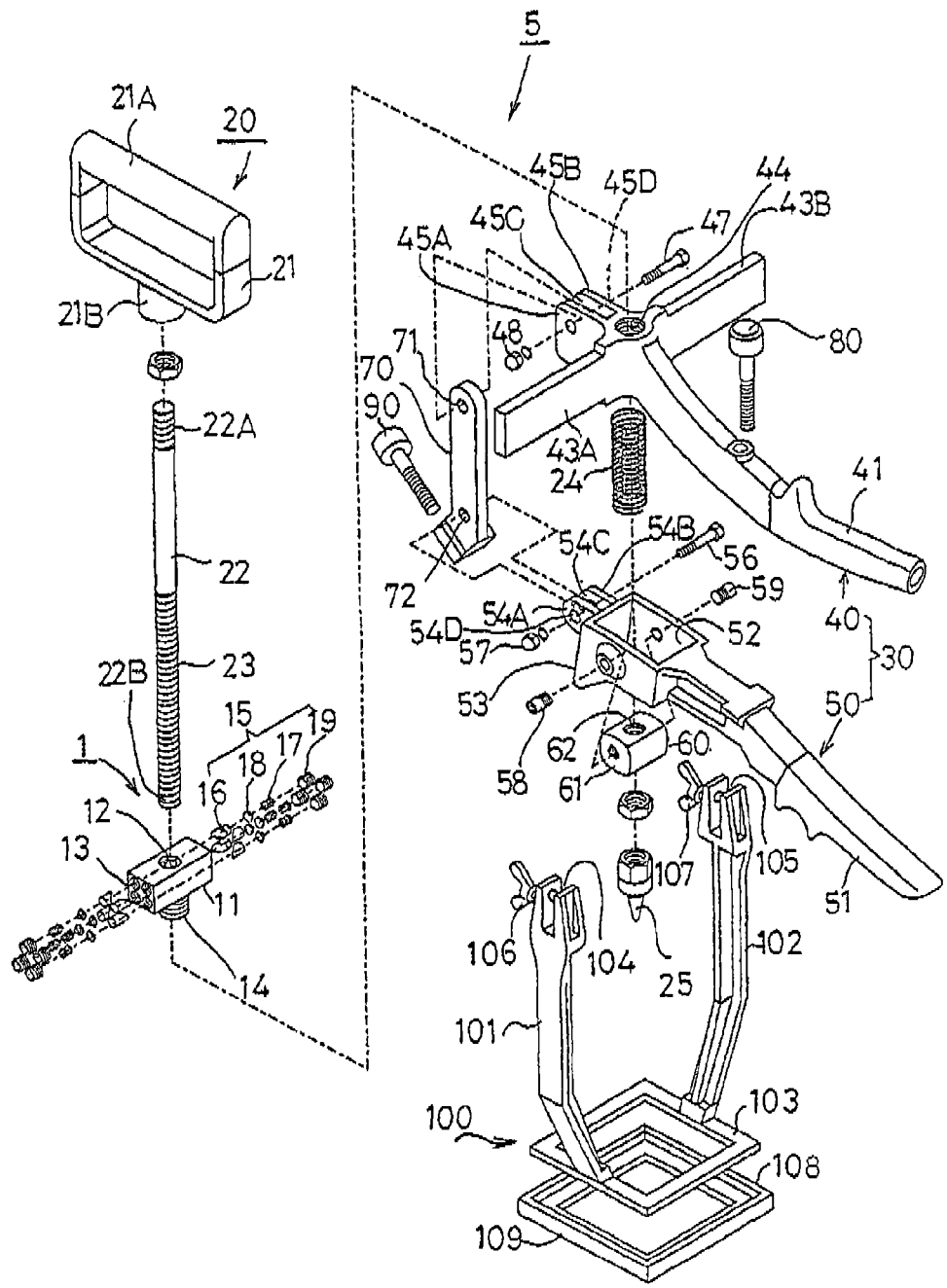
FIG. 3 is an exploded perspective view showing constituent components of the sheet-metal puller shown in FIG. 1.
Figure 1:
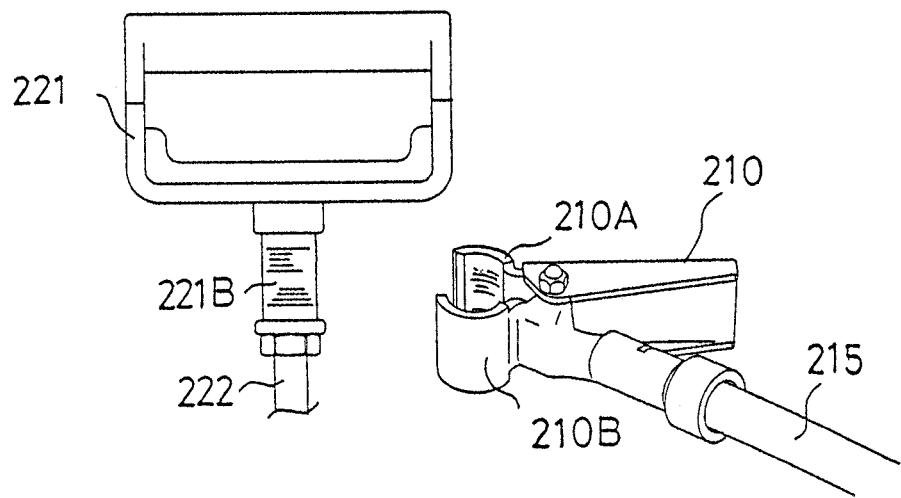
FIG. 1 is a perspective view of a sheet-metal puller formed by incorporating an electrical conduction mechanism according to the present invention.
Figure 14:
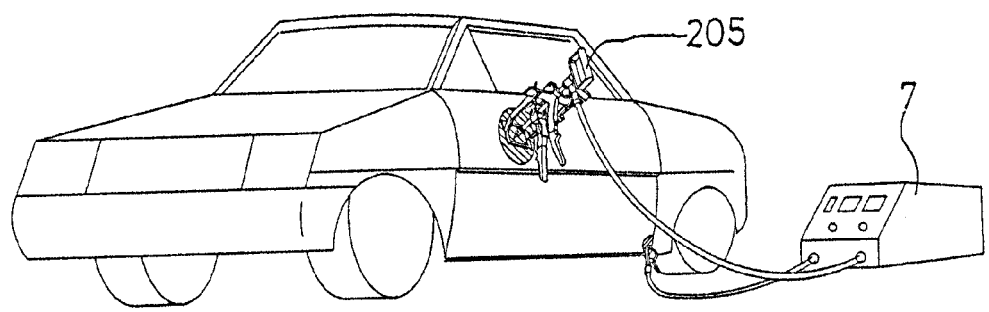
FIG. 14 is a perspective view showing a state where the sheet-metal puller according to a conventional art is used.

Sheet-Metal Puller Incorporating the Electrical Conduction Mechanism:

FIGS. 1 to 3 show a sheet-metal puller incorporating the electrical conduction mechanism 1. In the sheet-metal puller 5, the electrical conduction mechanism 1 is incorporated in the center of the sheet-metal puller 5.

The sheet-metal puller 5 is equipped with a first manipulating member 20 whose distal end portion is provided with the bit 25 weldable on the sheet-metal face, a supporting portion 60 for supporting the first manipulating member 20, a second manipulating member 30 which pulls up the first manipulating member 20 manually, and a leg body 100 for supporting the second manipulating member 30.

Among them, the first manipulating member 20 is provided with the shaft 22 and a handle 21 for rotating the shaft, which is provided at one end of the shaft 22, and the bit 25 is disposed at a distal end portion of the shaft 22. More specifically, one end portion 22A of the shaft 22 constituting the first manipulating member 20 is screwed into a threaded hole of a connection portion 21B formed so as to be continuously connected to the handle 21, while a distal end portion 22B of the shaft 22 is screwed into a threaded hole provided at a proximal end portion of the bit 25. A threaded portion 23 is engraved from the approximate center of the shaft 22 to a proximal end portion, and the thread portion 23 is screwed into the support portion 60 of the second manipulating member 30 described later, so that the first manipulating member 20 is rotatably supported by the second manipulating member 30. A spring 24 is wound around the shaft 22. Further, a grip 21A of the handle 21 is covered with an insulating member.

The second manipulating member 30 is configured to include the main lever 40; a second lever 50; a coupling arm 70 which couples the main lever 40 and the second lever 50; and the spring 24 interposed between the main lever 40 and the second lever 50.

The main lever 40 is provided with a grip 41 formed by covering the main lever 40 with an insulating member, a pair of left and right arms 43A, 43B which extend in a direction perpendicular to a direction in which the grip 41 is disposed, and which are supported by the leg body 100, a shaft-guiding through-hole 44 to be inserted by the shaft 22, which is formed by boring a hole in a central portion between the arms (see FIG. 3), and a pair of right and left projection portions 45B, 45A which project outward from the center between the arms and which are formed so as to have a gap 45C therebetween. One end of a power source cord (terminal cord) 105 is fixed to a rear end of the main lever 40, while the other end of the power source cord is connected to the welder 7.

Figure 6:
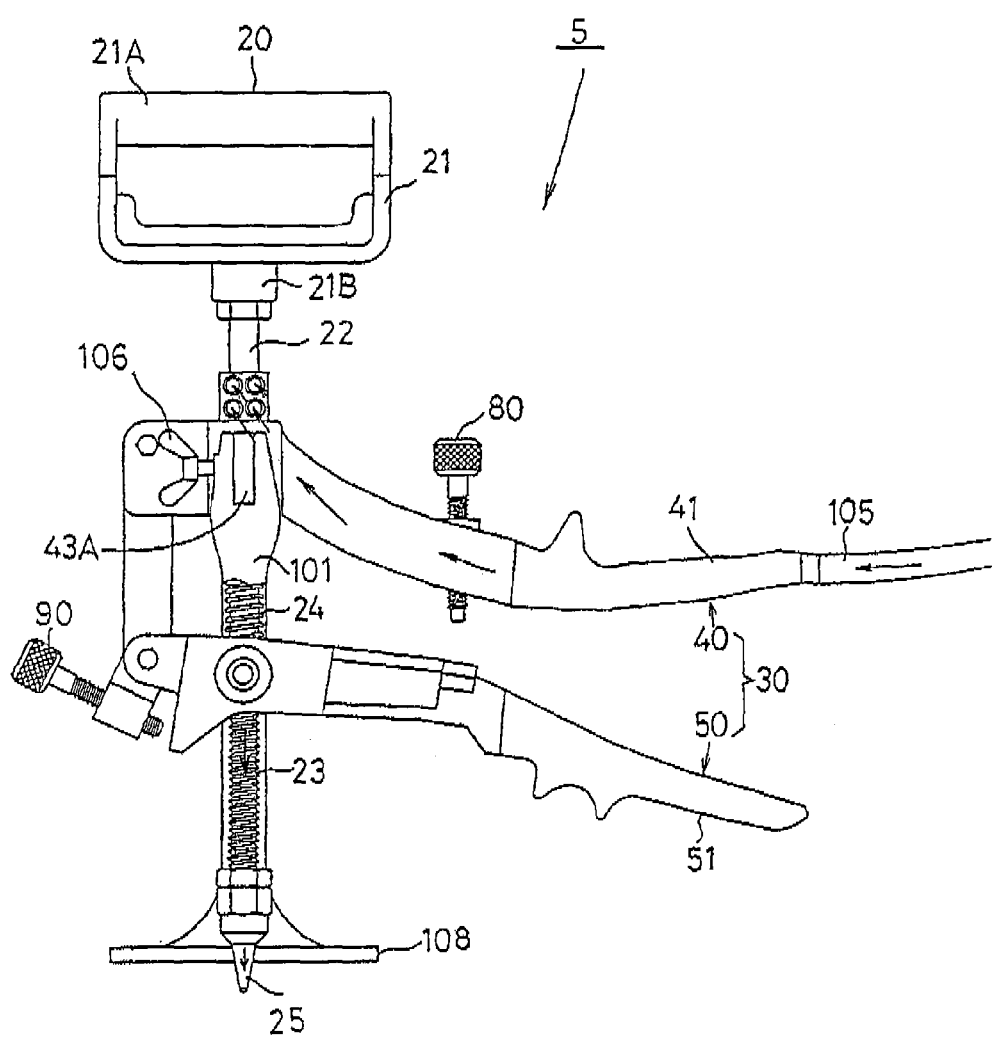
FIG. 6 is a partially-cutaway side view of the sheet-metal puller shown in FIG. 1, including the flow of current during electricity conduction.

The flow of current during sheet-metal repair work is shown in FIGS. 6 and 7. During electricity conduction, electricity is conducted with the current flowing from the welder 7 through the power source cord 105, the main lever 40, the electrical-conduction portion main body 11, the electrical-conduction chip 16, the shaft 22 to the bit 25.

The second lever 50 is provided with a grip 51 formed by covering the second lever 50 with an insulating member, like the grip 41, a supporting portion 60 which is disposed in a hollow 52 formed in a distal end portion of the grip 51 and which supports the first manipulating member 20, and a pair of left and right projection portions 54A, 54B which project outward from a side end face 53 of the grip 51 and which are formed so as to have a gap 54C therebetween. The supporting portion 60 is supported in the second lever 50 by screws 58, 59 in a state where a supporting member 61 in which a female thread is formed in a central through-hole (pass-through portion) 62 is received in the hollow 52. Thus, the through-hole (pass-through portion) 62 of the supporting member 61 and the threaded portion 23 of the shaft 22 are screwed together, so that the first manipulating member 20 is rotatably supported by the second manipulating member 30.

Bolt-insertion holes 71, 72 are formed in an upper side and a lower side of the coupling arm 70. On the upper side of the coupling arm 70, an upper arm of the coupling arm 70 is inserted into the gap 45C of the main lever 40, and a bolt 47 is inserted through the bolt-insertion holes 45D, 71 and fixed by a nut 48. Meanwhile, on the lower side of the coupling arm 70, a lower arm of the coupling arm 70 is inserted into the gap 54C of the second lever 50, and a bolt 56 is inserted through the bolt-insertion holes 54D, 72 and attached with a nut 57.

Thus, the main lever 40 and the second lever 50 are coupled via the coupling arm 70. In this case, the second lever 50 is pivotally supported in the coupling arm 70 using the bolt 56 inserted through the bolt-insertion hole 72 of the coupling arm 70 as a short axis. Further, since the spring 24 is interposed between the main lever 40 and a top face of the support 60 in a wound state, the second lever 50 is always biased downward in FIGS. 1 to 2.

The reference numeral 80 denotes a stopper which abuts on an upper face of the second lever 50 to prevent the second lever 50 from moving unnecessarily upward when the second lever 50 is pulled up manually.

The reference numeral 90 denotes a grip-width adjusting means which is disposed between the coupling arm 70 and the second lever 50 so as to adjust a grip width between the main lever 40 and the second lever 50.

The leg body 100 is composed of a face-contact member 103, leg portions 101, 102 standing on the face-contact member, and a cushion 108 formed around the face-contact member 103, and the face-contact member 103 and the cushion 108 form a face-contact portion 109 which comes in contact with a sheet-metal face. Guide grooves 104, 105 are formed in respective upper portions of the leg portions 101, 102, so that the arms 43A, 43B of the main lever 40 are inserted into the guide grooves 104, 105 and fixed by screws 106, 107.

Figure 10:
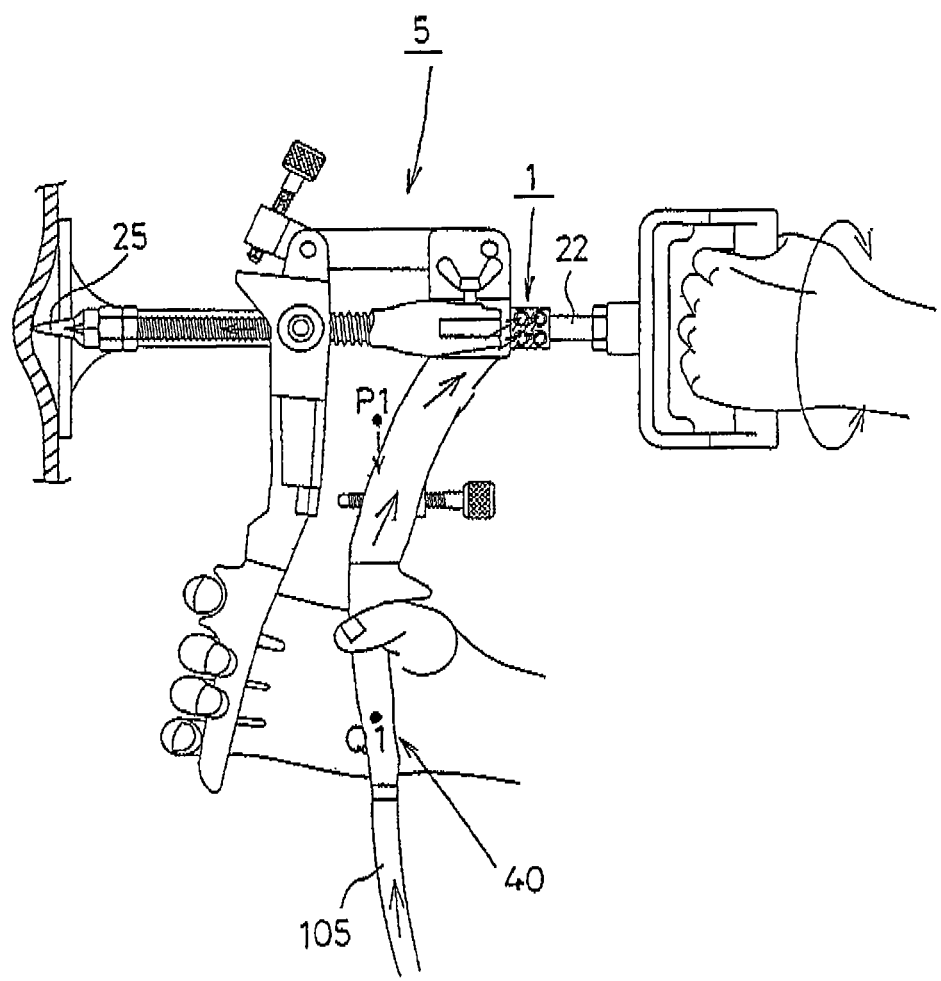
FIG. 10 is a view showing a state where the sheet-metal puller shown in FIG. 1 is used in a lateral position, including the flow of current during electricity conduction.
Figure 11:
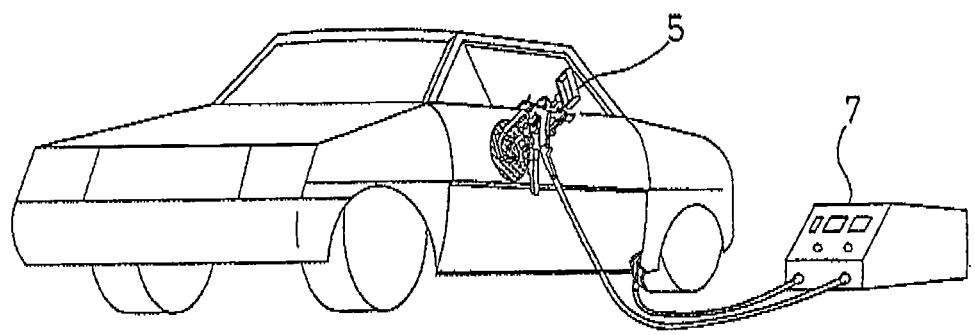
FIG. 11 is a perspective view showing a state where the sheet-metal puller shown in FIG. 1 is used.
Figure 12:
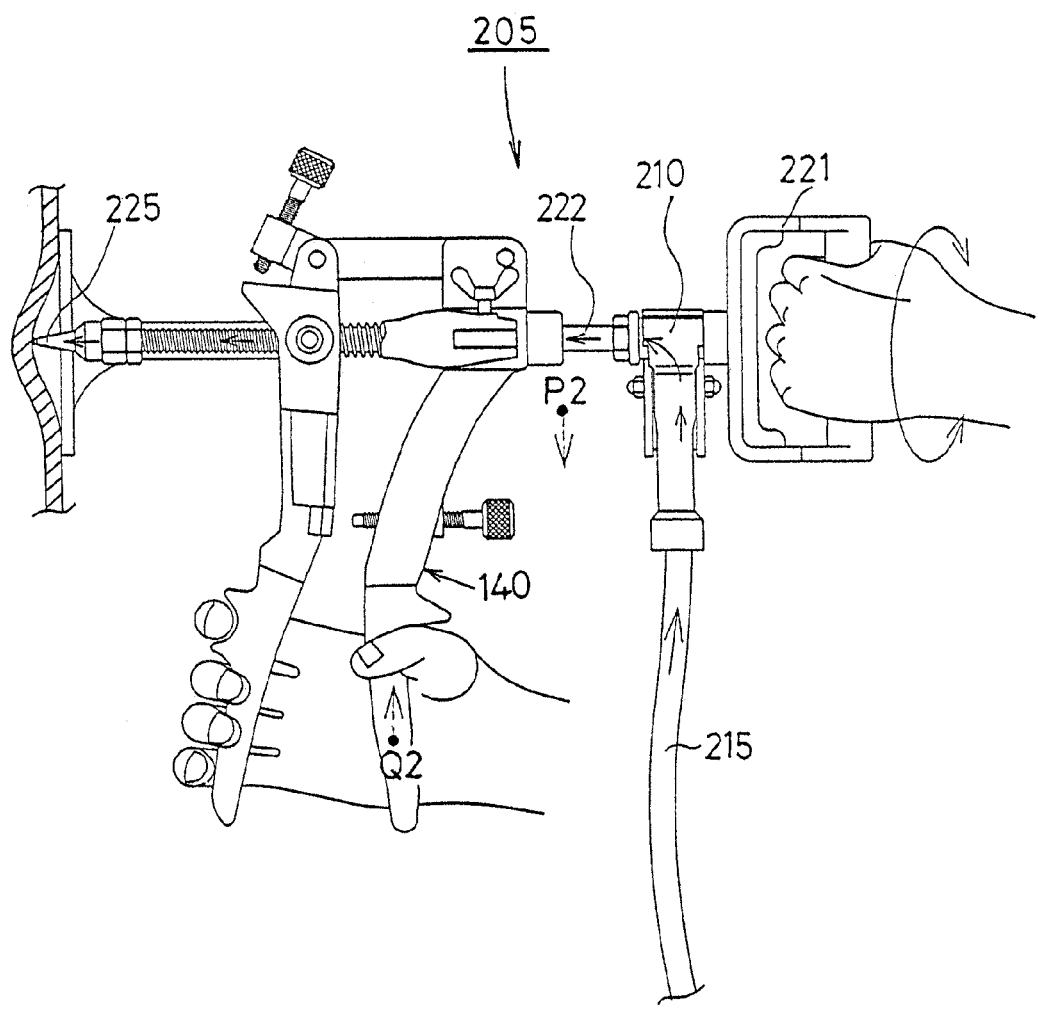
FIG. 12 is a view showing a state where a sheet-metal puller according to a conventional art is used in a lateral position, including the flow of current during electricity conduction.

If the position of the center of gravity of the sheet-metal puller when it is used in a vertical position is located at a point P1 in FIG. 10, when the sheet-metal puller is used in a lateral position, P1 is deviated slightly downward in FIG. 10, as shown by a broken line in FIG. 10, due to the weight of the power source cord, but a fulcrum Q1 formed in the first manipulating member 40 of the sheet-metal puller during sheet-metal repair work does not fluctuate and stays constant, so that, even if the sheet-metal work takes a long time, a hand holding the sheet-metal puller does not easily get tired and good workability is ensured.

Thus, the electrical conduction mechanism is applicable as an electrical conduction mechanism which conducts electricity to the bit of a sheet-metal puller, and which is equipped with a first manipulating member provided with the bit which is disposed in a distal end portion of a shaft and which is weldable on a sheet-metal face, a supporting portion for supporting the first manipulating member, a second manipulating member for pulling up the first manipulating member, and a leg body for supporting the second manipulating member. This electrical conduction mechanism comprises an electrical-conduction portion main body which is formed with a conductive member, in the center of which a first through-hole to be inserted through by the shaft is formed, and in which a second through-hole communicating with the first through-hole is formed in a direction perpendicular to a direction in which the first through-hole is formed; and an electrical-conduction element disposed in the second through-hole; wherein the electrical-conduction element is configured to include an electrical-conduction chip abutting on the shaft, and a coil spring biasing the electrical-conduction chip toward the shaft, so that current is supplied to the shaft through the electrical-conduction chip to conduct electricity to the bit.

Further, the electrical conduction mechanism is applicable as an electrical conduction mechanism which conducts electricity to a bit of a sheet-metal puller, and which is equipped with a shaft, a first manipulating member provided with a bit which is disposed in a distal end portion of the shaft and which is weldable on a sheet-metal face, a second manipulating member which is provided with a supporting portion for supporting the first manipulating member and which pulls up the first manipulating member manually, and a leg body for supporting the second manipulating member. This electrical conduction mechanism comprises an electrical-conduction portion main body which is formed with a conductive member, in the center of which a first through-hole to be inserted through by the shaft is formed, and in which a second through-hole communicating with the first through-hole is formed in a direction perpendicular to a direction in which the first through-hole is formed; and an electrical-conduction element disposed in the second through-hole; wherein the electrical-conduction element is configured to include an electrical-conduction chip abutting on the shaft, a coil spring biasing the electrical-conduction chip toward the shaft, and a spacer formed with an insulator which is interposed between the electrical-conduction chip and the coil spring to put the electrical-conduction chip and the coil spring from in a non-conductive state, so that current is supplied to the shaft through the electrical-conduction chip to conduct electricity to the bit.

What is claimed is:

1. A sheet-metal puller comprising:
   a first manipulating member provided with a bit which is disposed in a distal end portion of a shaft and which is configured to be weldable for attachment to a sheet-metal face;
   a supporting portion configured to support the first manipulating member;
   an electrical conduction mechanism;
   a power source cord for providing power to the electrical conduction mechanism;
   a second manipulating member configured to move the first manipulating member;
   a leg body configured to support the second manipulating member,
   wherein the first manipulating member is provided with the shaft with a handle for rotating the shaft at one end of the shaft; and
   the electrical conduction mechanism conducts electricity to the bit, characterized in that:
   the second manipulating member is connected to the power source cord;
   the electrical conduction mechanism includes an electrical-conduction portion main body which is formed as a conductive member with a first through-hole provided to receive the shaft, and in which at least one second through-hole is connected with the first through-hole in a direction perpendicular to a direction in which the first through-hole is formed; and
   at least one electrical-conduction element is disposed in the at least one second through-hole,
   wherein the at least one electrical-conduction element is configured to include at least one electrical-conduction chip abutting on the shaft, and at least one coil spring biasing the at least one electrical-conduction chip toward the shaft, so that current is supplied to the shaft through the at least one electrical-conduction chip to conduct electricity to the bit,
   wherein the electrical conduction mechanism is incorporated into the sheet-metal puller to provide electricity from the power source cord and attached to the second manipulating member to provide current to the shaft connected to the bit for welding the bit.

2. The sheet-metal puller according to claim 1, wherein the at least one electrical-conduction chip has a distal face found with an elliptical section, so that the distal face and the shaft abut on each other by a line contact in the electrical-conduction portion main body.

3. The sheet-metal puller according to claim 1, wherein a plurality of lateral holes are provided in the electrical-conduction portion main body and electrical-conduction elements are disposed in each of the lateral holes, with the shaft inserted through the first through-hole, and electrical-conduction chips are being positioned within each of the lateral holes to contact the shaft with equal pressure.

4. The sheet-metal puller according to claim 1, wherein the at least one second through-hole is formed with four lateral holes in upper and lower and right and left directions of the electrical-conduction portion main body and at least one electrical-conduction element is disposed in each of the lateral holes with the shaft inserted through the first through-hole, and electrical-conduction chips aligned with the shaft and abut into the shaft with equal pressure.

5. The sheet-metal puller according to claim 1, comprising a spacer formed with an insulator which is interposed between the electrical-conduction chip and a coil spring to position the electrical-conduction chip and the coil spring in a non-conductive state.

6. The sheet-metal puller according to claim 1, wherein the electrical-conduction element is inserted into the at least one second through-hole, and, with the electrical-conduction chip abuts on the shaft and a screw is screwed into an opening portion of the at least one second through-hole to close the opening portion.

7. The sheet-metal puller according to claim 1, wherein the second manipulating member is provided with the supporting portion configured to support the first manipulating member and to apply manual force to the first manipulating member.

8. A sheet metal puller for repairing dents in a sheet-metal face comprising:
   a first manipulating member having a shaft with a bit on a distant end portion of the shaft and a handle at another end of the shaft;
   a second manipulating member connected to the first manipulating member for supplying force to the bit on the first manipulating member, wherein the second manipulating members has a pair of grips that can be manually forced towards each other to provide movement of the bit; and
   an electrical power cord is connected to one of the pair of grips to supply electrical power to the bit on the first manipulating member to enable welding the bit on a sheet-metal face;
   wherein the first manipulating member includes an electrical-conduction portion main body which is formed with a conductive member, having a first through-hole for receiving the shaft, and in which a second through-hole communicating with the first through-hole is formed in a direction perpendicular to a direction in which the first through-hole is formed; and
   an electrical-conduction element is disposed in the second through-hole, wherein the electrical-conduction element is configured to include an electrical-conduction chip abutting on the shaft, and a coil spring biasing the electrical-conduction chip toward the shaft, so that current is supplied to the shaft through the electrical-conduction chip to conduct electricity to the bit.

9. A sheet-metal puller as defined in claim 8, wherein the electrical-conduction chip has a distal face obtained by cutting a columnar member obliquely so as to form an elliptical section, the elliptical section of the distal face of the electrical-conduction chip and the shaft abut on each other with a line contact in the electrical-conduction portion main body.

10. A sheet-metal puller as defined in claim 9, wherein the second through-hole is formed with lateral holes at four places in upper and lower and right and left directions of the electrical-conduction portion main body relative to one another, and electrical-conduction element is disposed in each of the lateral holes with the shaft inserted through the first through-hole, and the electrical-conduction chips facing each other via the shaft to abut on the shaft with equal pressure.

11. A sheet-metal puller having an electrical conduction mechanism which conducts electricity to a bit of the sheet-metal puller, comprising:
   a shaft;
   a first manipulating member provided with the bit which is disposed on a distal end portion of the shaft and which is weldable on a sheet-metal face;

a second manipulating member which is provided with a supporting portion for supporting the first manipulating member and which can move the first manipulating member manually;

a leg body for supporting the second manipulating member;

an electrical-conduction portion main body which is formed with a conductive member having a first through-hole to permit the shaft to move therein, and a second through-hole communicating with the first through-hole in a direction perpendicular to a direction in which said first through-hole is formed; and an electrical-conduction element disposed in the second through-hole, wherein the electrical-conduction element is configured to include an electrical-conduction chip abutting on the shaft, a coil spring biasing the electrical-conduction chip toward the shaft, and a spacer formed with an insulator which is interposed between the electrical-conduction chip and the coil spring to enable the electrical-conduction chip and the coil spring to be in a non-conductive state, so that current is supplied to the shaft through the electrical-conduction chip to conduct electricity to the bit.

12. The sheet metal puller as defined in claim 11, wherein the second through-hole is formed with lateral holes at four places in upper and lower and right and left directions of the electrical-conduction portion main body relative to one another, the electrical-conduction element is disposed in each of the lateral holes with the shaft inserted through the first through-hole, and the electrical-conduction chips spaced around the shaft to abut on the shaft with equal pressure.

13. The sheet metal puller as defined in claim 12, wherein the electrical-conduction element is inserted into the second through-hole with the electrical-conduction chip abutting on the shaft and a screw is screwed into an opening portion of the second through-hole to close the opening portion.

\* \* \* \* \*